United States Patent

Kawase

(10) Patent No.: US 9,451,384 B2
(45) Date of Patent: Sep. 20, 2016

(54) MOBILE TERMINAL CONTROL APPARATUS

(71) Applicant: Panasonic Corporation, Osaka (JP)

(72) Inventor: Kazushi Kawase, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 106 days.

(21) Appl. No.: 14/383,413

(22) PCT Filed: Mar. 22, 2013

(86) PCT No.: PCT/JP2013/001958
§ 371 (c)(1),
(2) Date: Sep. 5, 2014

(87) PCT Pub. No.: WO2013/145672
PCT Pub. Date: Oct. 3, 2013

(65) Prior Publication Data
US 2015/0079969 A1  Mar. 19, 2015

(30) Foreign Application Priority Data

Mar. 26, 2012 (JP) .............................. 2012-069401

(51) Int. Cl.
*H04M 3/00* (2006.01)
*H04W 4/00* (2009.01)
(Continued)

(52) U.S. Cl.
CPC .............. *H04W 4/003* (2013.01); *G08C 17/02* (2013.01); *H04M 1/6083* (2013.01); *H04W 8/18* (2013.01); *G08C 2201/34* (2013.01); *H04M 1/72533* (2013.01); *H04M 1/72558* (2013.01)

(58) Field of Classification Search
USPC .................. 455/419, 418, 420, 456, 457
See application file for complete search history.

(56) References Cited

U.S. PATENT DOCUMENTS

2007/0154008 A1* 7/2007 Pomerantz .......... H04M 1/2473
                                                    379/355.02
2009/0138507 A1* 5/2009 Burckart .............. G11B 27/105
(Continued)

FOREIGN PATENT DOCUMENTS

EP   2375709      10/2011
JP   2008-278388  11/2008
(Continued)

OTHER PUBLICATIONS

Supplementary European Search Report for EP 13768643 dated Feb. 5, 2015 (5 pages total).
(Continued)

*Primary Examiner* — David Q Nguyen
(74) *Attorney, Agent, or Firm* — Hamre, Schumann, Mueller & Larson, P.C.

(57) ABSTRACT

The objective of the invention is to arrange that, when a plurality of mobile terminals are connected to, for example, a vehicle-mounted device, a to-be-controlled application be automatically determined in accordance with the connection history and the types of applications on the mobile terminals. A mobile terminal control apparatus (1) comprises: a device control unit (12) that detects whether a plurality of mobile terminals (2) are connected or not and that holds device information and application information into a connection history (11); and an application control unit (14) that determines, out of a plurality of applications held by connected mobile terminals (2), a to-be-controlled application on the basis of the connection history (11) and an application DB (13). In this way, when a plurality of mobile terminals are connected to a vehicle-mounted device, a to-be-controlled application can be automatically determined in accordance with the connection history and the types of applications on the mobile terminals.

8 Claims, 5 Drawing Sheets

(51) Int. Cl.
*H04M 1/60* (2006.01)
*H04W 8/18* (2009.01)
*G08C 17/02* (2006.01)
*H04M 1/725* (2006.01)

(56) References Cited

U.S. PATENT DOCUMENTS

| | | | |
|---|---|---|---|
| 2010/0130182 A1* | 5/2010 | Rosen | G06K 9/00785 455/414.1 |
| 2010/0216400 A1 | 8/2010 | Ushijima | |
| 2010/0216401 A1 | 8/2010 | Kitahara | |
| 2010/0274370 A1 | 10/2010 | Ochi | |
| 2012/0196583 A1* | 8/2012 | Kindo | H04M 1/6091 455/415 |

FOREIGN PATENT DOCUMENTS

| | | |
|---|---|---|
| JP | 2010-130669 | 6/2010 |
| JP | 2010-258956 | 11/2010 |
| JP | 2012-010287 | 1/2012 |
| WO | 2009/072196 | 6/2009 |
| WO | 2011/047260 | 4/2011 |

OTHER PUBLICATIONS

Japanese Office Action, Mar. 14, 2016; Application No. 2012-069401 with English translation (4 pages).

* cited by examiner

FIG. 3

| IC CORRECTION | DEVICE ID | NUMBER OF TIMES OF CORRECTION | LAST APP ID | UNDER CONTROL | HELD APP ID | NUMBER OF TIMES OF CONTROL |
|---|---|---|---|---|---|---|
| 1 | 001 | 100 | A | 1 | A | 90 |
| | | | | 0 | B | 20 |
| | | | | 0 | D | 2 |
| 1 | 002 | 10 | B | 0 | A | 0 |
| | | | | 0 | B | 10 |
| 0 | 003 | 15 | B | 0 | B | 10 |
| | | | | 0 | C | 5 |

FIG. 4

| | MAP | AUDIO | SNS |
|---|---|---|---|
| 1 | B | A | C |
| 2 | E | F | D |
| 3 | G | H | I |

FIG. 5

| IN CONNECTION | DEVICE ID | NUMBER OF TIMES OF CONNECTION | LAST APP ID | UNDER CONTROL | HELD APP ID | NUMBER OF TIMES OF CONTROL |
|---|---|---|---|---|---|---|
| 1 | 001 | 100 | A | 1 | A | 90 |
| | | | | 0 | B | 20 |
| | | | | 0 | D | 2 |
| 1 | 002 | 10 | A | 0 | A | 20 |
| | | | | 0 | B | 10 |
| 0 | 003 | 15 | B | 0 | B | 10 |
| | | | | 0 | C | 5 |

FIG. 6

| IN CONNECTION | DEVICE ID | NUMBER OF TIMES OF CONNECTION | LAST APP ID | UNDER CONTROL | HELD APP ID | NUMBER OF TIMES OF CONTROL |
|---|---|---|---|---|---|---|
| 1 | 001 | 100 | A | 1 | A | 90 |
| | | | | 0 | B | 20 |
| | | | | 0 | D | 2 |
| 1 | 002 | 10 | A | 0 | A | 20 |
| | | | | 0 | F | 10 |
| | | | | 0 | H | 5 |

FIG. 7

| IN CONNECTION | DEVICE ID | NUMBER OF TIMES OF CONNECTION | LAST APP ID | UNDER CONTROL | HELD APP ID | NUMBER OF TIMES OF CONTROL |
|---|---|---|---|---|---|---|
| 1 | 001 | 100 | A | 1 | A | 90 |
| | | | | 0 | B | 20 |
| | | | | 0 | D | 2 |
| 1 | 002 | 10 | A | 0 | A | 20 |
| | | | | 0 | F | 10 |
| | | | | 0 | I | 5 |

| IN CONNECTION | DEVICE ID | NUMBER OF TIMES OF CONNECTION | LAST APP ID | UNDER CONTROL | HELD APP ID | NUMBER OF TIMES OF CONTROL |
|---|---|---|---|---|---|---|
| 1 | 001 | 100 | A | 1 | A | 90 |
|   |     |     |   | 0 | B | 20 |
|   |     |     |   | 0 | D | 2 |
| 1 | 002 | 10 | A | 0 | A | 20 |
|   |     |    |   | 0 | E | 10 |
|   |     |    |   | 0 | I | 5 |

MOBILE TERMINAL CONTROL APPARATUS

TECHNICAL FIELD

The present invention relates to a mobile terminal control apparatus and a mobile terminal control method in which, when plural mobile terminals are connected, for example, to a vehicle-mounted device, an application to be controlled is automatically determined in accordance with the connection history and the types of applications on the mobile terminals.

BACKGROUND ART

As a conventional mobile terminal control apparatus, an apparatus which automatically selects an application to be controlled is known. For example, there is an apparatus which selects from plural applications held on a mobile phone in accordance with a selection standard registered as default, when streaming audio data from the mobile phone to a vehicle-mounted device is carried out via Bluetooth (trademark registered) (see, for example, PTL 1).

CITATION LIST

Patent Literature

PTL 1: JP-A-2010-258956

SUMMARY OF INVENTION

Technical Problem

However, the conventional mobile terminal control apparatus has a problem that, when plural mobile terminals are connected, an application for each of the plural mobile terminals cannot be automatically selected.

In order to solve the problem of the conventional apparatus, it is an object of the invention to provide a mobile terminal control apparatus and a mobile terminal control method in which, when plural mobile terminals are connected to, for example, a vehicle-mounted device, an application to be controlled for each mobile terminal can be automatically determined in accordance with the connection history and the types of applications on the mobile terminals.

Solution to Problem

To achieve the above object, the invention has a configuration including: a device control unit that detects whether plural mobile terminals are connected or not and that holds device information and application information in a connection history; and an application control unit that determines an application to be controlled, out of plural applications held on the connected mobile terminals, on the basis of the connection history and an application DB. The connection history is a history of control of the device information and the application information of the connected mobile terminals. The application DB is a list holding a list of controllable application IDs by each category indicating a type of application.

Advantageous Effects of Invention

According to the invention, the effect is achieved that, when plural mobile terminals are connected to, for example, a vehicle-mounted device, an application to be controlled for each mobile terminal can be automatically determined in accordance with the connection history and the types of applications on the mobile terminals.

BRIEF DESCRIPTION OF DRAWINGS

FIG. 3 is an explanatory view showing a connection history (specific example 1) of the mobile terminal control apparatus according to the embodiment of the invention.

FIG. 4 is an explanatory view showing an application DB of the mobile terminal control apparatus according to the embodiment of the invention.

FIG. 5 is an explanatory view showing the connection history (specific example 2) of the mobile terminal control apparatus according to the embodiment of the invention.

FIG. 6 is an explanatory view showing the connection history (specific example 3) of the mobile terminal control apparatus according to the embodiment of the invention.

FIG. 7 is an explanatory view showing the connection history (specific example 4) of the mobile terminal control apparatus according to the embodiment of the invention.

DESCRIPTION OF EMBODIMENTS

Hereinafter, a mobile terminal control apparatus according to an embodiment of the invention will be described with reference to the drawings.

Figure 1:
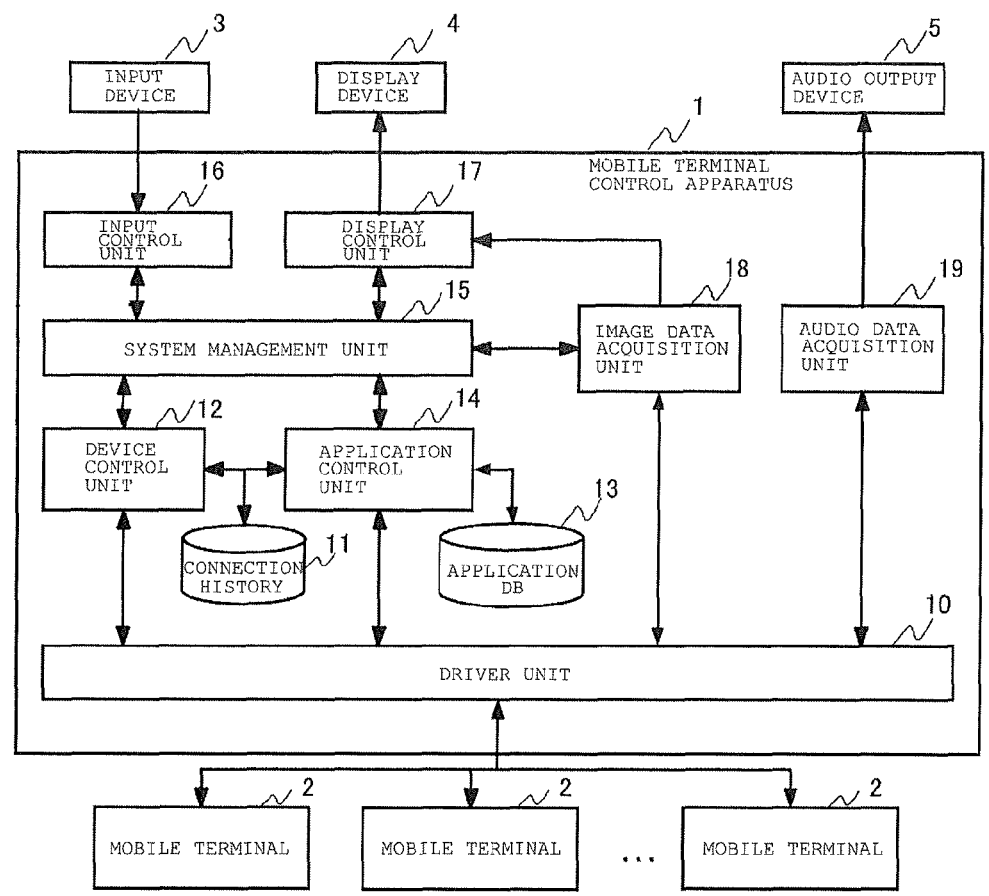
FIG. 1 is a block diagram of a mobile terminal control apparatus according to an embodiment of the invention.

FIG. 1 is a block diagram of the mobile terminal control apparatus according to the embodiment of the invention.

As shown in FIG. 1, a mobile terminal control apparatus 1 is connected to an input device 3, a display device 4, an audio output device 5, and plural mobile terminals 2.

The mobile terminal control apparatus 1 includes each configuration shown in FIG. 1 that is described below. A driver unit 10 controls communication with the connected mobile terminals 2. A device control unit 12 detects whether the plural mobile terminals 2 are connected or not, and holds device information and application information in a connection history 11. The connection history 11 will be described later with reference to FIG. 3. An application control unit 14 determines an application to be controlled, of the plural applications held on the connected mobile terminals 2 (held applications), on the basis of the connection history 11 and an application DB 13. The application DB 13 will be described later with reference to FIG. 4. A system management unit 15 controls the entirety of the mobile terminal control apparatus 1. An input control unit 16 acquires operation data inputted from the input device 3. A display control unit 17 outputs display data to the display device 4. An image data acquisition unit 18 acquires image data from the applications of the mobile terminals 2 via the driver unit 10 and passes on the image data to the display control unit 17. An audio data acquisition unit 19 acquires audio data from the applications of the mobile terminals 2 via the driver unit 10 and passes on the audio data to the audio output device 5.

Here, the connection history 11 is the history of device information and application information such as flags. For example, as shown in FIG. 3, a flag that indicates that it is in connection, a device ID that specifies a mobile terminal 2 connected in the past, the number of times of connection with this mobile terminal, a last application ID that specifies an application controlled in the previous connection, a flag that indicates that it is under control, a held application ID that specifies an application which the mobile terminal control apparatus 1 has controlled in the past, of the applications held on the mobile terminal 2, and the number of times of control of each held application in the past, or the like are recorded as the connection history 11.

Also, the application DB 13 is a list that holds a list of application IDs that are controllable by the mobile terminal control apparatus 1, by each category indicating a type of application, as shown in FIG. 4. For example, categories such as a MAP category that indicates an application capable of displaying maps and navigation, an AUDIO category that indicates an application capable of reproducing audio data, and an SNS (social networking service) category capable of sending and receiving messages are provided.

The processing operation of the mobile terminal control apparatus 1 configured as described above will be described hereinafter.

Figure 2:
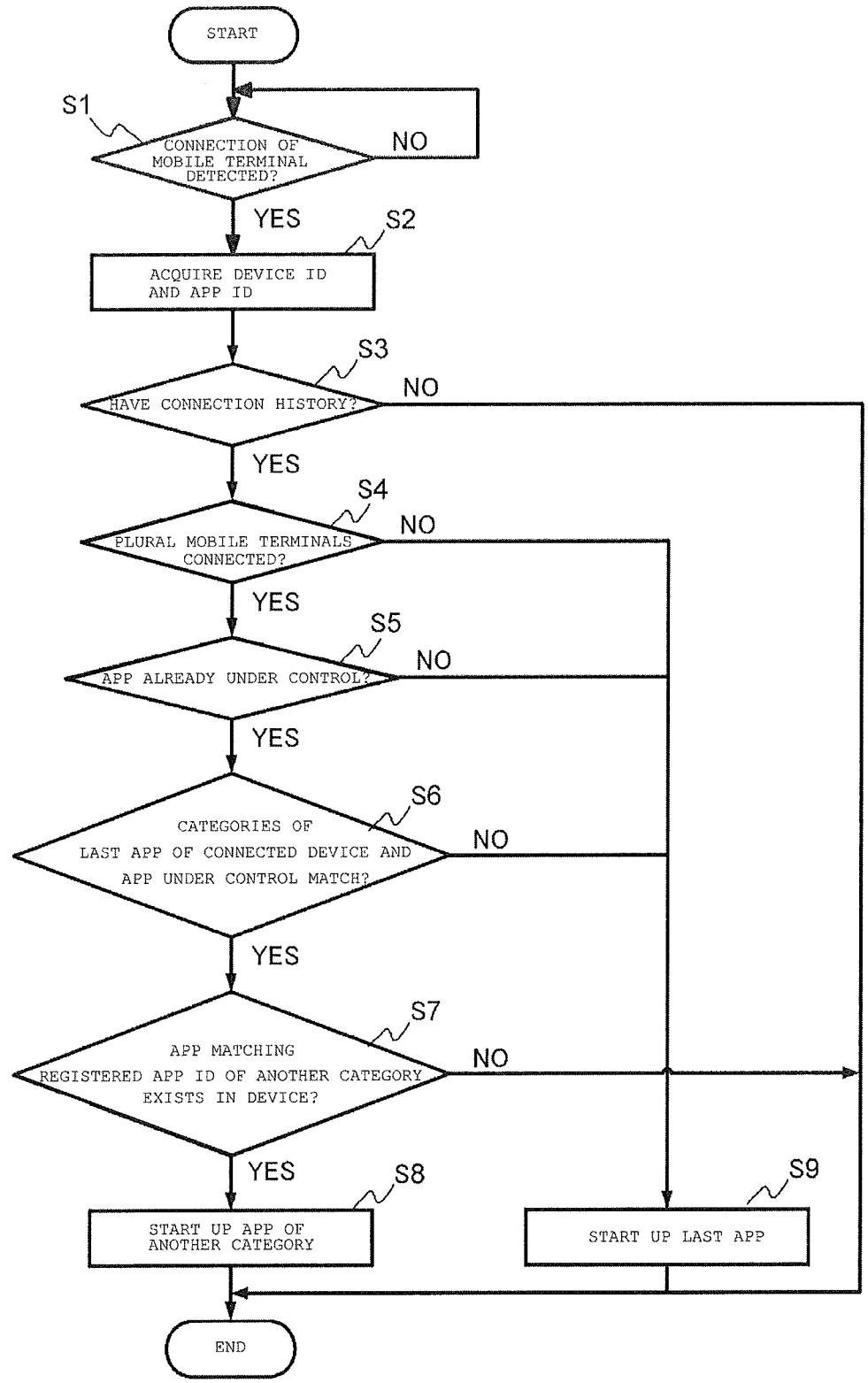
FIG. 2 is a flowchart for explaining the operation of the mobile terminal control apparatus according to the embodiment of the invention.

FIG. 2 is a flowchart of a mobile terminal control method using the mobile terminal control apparatus 1 according to the embodiment of the invention.

First, in Step 1 (S1), connection of a mobile terminal 2 is detected. In this terminal detection step S1, the device control unit 12 in the mobile terminal control apparatus 1 detects whether a mobile terminal 2 is connected or not.

In Step 2 (S2), the device ID and application ID of the mobile terminal 2 are acquired.

In the mobile terminal control apparatus 1, the device control unit 12 detects the connection of the mobile terminal 2. Then, the device control unit 12 acquires the device ID of the mobile terminal 2 and the held application ID (held app ID) of the held application that is held on the mobile terminal 2.

In this held app acquisition step S2, the device control unit 12 also acquires the last app ID that specifies the last application used when controlling the mobile terminal 2 that is detected as connected.

In Step 3 (S3), it is determined whether the mobile terminal 2 detected as connected in Step 1 has ever been connected to the mobile terminal control apparatus 1 in the past or not.

In this connection history determination step S3, the device control unit 12 in the mobile terminal control apparatus 1 makes a comparison to determine whether the acquired device ID matches a device ID held in the connection history 11 or not. Then, it is determined whether a device ID matching the acquired device ID exists in the connection history 11 or not.

If there is already a matching device ID, the number of times of connection with the device ID in question and the number of times of connection with the held app ID are updated in the connection history 11, and the processing goes to Step 4 (S4).

If there is no matching device ID, the device ID and held app ID are added to the connection history 11, and the processing ends, assuming that there is no held app ID to start controlling.

As described above, the device control unit 12 determines whether the device ID that specifies the mobile terminal 2 detected in Step 1 matches the device ID in the connection history 11 of the mobile terminal control apparatus 1.

In Step 4 (S4), it is determined whether plural mobile terminals 2 are connected or not.

In this plural terminals detection step S4, the device control unit (control unit) 12 in the mobile terminal control apparatus 1 confirms whether plural device IDs in connection exist in the connection history 11 or not. That is, the device control unit (control unit) 12 determines whether another mobile terminal 2 than the mobile terminal 2 detected as connected is connected to the mobile terminal control apparatus 1 or not.

If there are plural mobile terminals, the processing goes to Step 5 (S5). If there aren't plural mobile terminals, the processing goes to Step 9 (S9).

In FIG. 3, a mobile terminal 2 (device ID=001) and a mobile terminal 2 (device ID=002) have a flag 1 indicating the mobile terminal is in connection. This indicates that it is the case where, of the three mobile terminals 2 with the device IDs thereof recorded in the connection history 11, the above two mobile terminals 2 are connected to the mobile terminal control apparatus 1.

In Step 5 (S5), it is determined whether or not there is an application under control in the mobile terminal 2 that is already in connection.

In this controlled app information acquisition step S5, the application control unit (control unit) 14 in the mobile terminal control apparatus 1 confirms whether an app ID under control (controlled application ID) exists in the connection history 11 or not. If there is one or more app IDs under control, the processing goes to Step 6 (S6). If there is no app ID under control, the processing goes to Step 9 (S9).

Here, the case where the information shown in FIG. 3 is recorded as the connection history 11 is considered. It is assumed that a new mobile terminal 2 (device ID=002) is detected in the terminal detection step S1. In this case, the application control unit (control unit) 14 acquires the held app ID of A with the under-control flag of 1, as a controlled application ID, out of the applications (A, B, D) held on the already connected mobile terminal 2 (device ID=001) with the in-connection flag of 1 in the connection history 11 shown in FIG. 3.

In Step 6 (S6), the mobile terminal control apparatus 1 determines whether the types of the application under control and the application controlled in the previous connection in the newly connected mobile terminal 2 match each other or not.

Step 6 is equivalent to a category determination step in which it is determined whether the categories of the controlled application and the held application match each other or not.

The application control unit 14 in the mobile terminal control apparatus 1 determines the category of the app ID under control in the connection history 11, referring to the application DB 13 (see FIG. 4). Also, the last app ID of the connected mobile terminal 2 is confirmed in the connection history 11, and the corresponding category is determined in the application DB 13.

In this type determination step S6, the application control unit 14 determines whether the category of the under-control app ID and the category of the last app ID of the connected mobile terminal 2 match each other. If the categories match, the processing goes so Step 7 (S7). If the processing goes to Step 9 (S9).

As shown in FIG. 3, the last app ID of the mobile terminal 2 (device ID=002) detected in the terminal detection step S1 is B. Also, the controlled app ID (held app ID) of the controlled application (the one having the under-control flag 1, of the held applications) of the mobile terminal 2 (device ID=001) that is already connected to the mobile terminal control apparatus 1 is A.

As shown in FIG. 4, the last application with the ID of B is of the category MAP, whereas the controlled application with the ID of A is of the category AUDIO. Therefore, in this case, the application control unit 14 determines that the two categories (types) do not match, and shifts to Step 9.

Meanwhile, if there are plural mobile terminals 2 that are already connected to the mobile terminal control apparatus 1, the type determination step S6 is carried out with each mobile terminal 2. When it is determined that category does not match any of the controlled applications of the mobile terminals 2, the processing shifts to Step 9.

FIGS. 5 to 8 show different examples of the connection history 11 than FIG. 3.

If the last app ID of the device ID=002 is A, as shown in FIG. 5, the application control unit 14 determines that the two categories (types) match, and shifts to Step 7. Also, if the last app ID of the device ID=002 is F or H in FIG. 5 (in this case, the held app ID includes F or H as well), the category (type) matches A, as shown in FIG. 4, and therefore the processing shifts to Step 7.

In step 7 (S7), it is confirmed whether a controllable application that is classified in a different category from the category to which the last application controlled in the previous connection in the connected mobile terminal 2 belongs, exists within the mobile terminal 2 or not.

The application control unit 14 in the mobile terminal control apparatus 1 acquires the held app ID of the connected mobile terminal 2, referring to the connection history 11. The corresponding category is referred to in the application DB 13, in order from the largest number of times of control from among the acquired held app IDs, and it is confirmed whether the category to which the controlled application already under control in the mobile terminal control apparatus 1 belongs and the category to which the held application belongs match each other or not.

If the two categories do not match, the held app ID is determined as the application to be controlled at the connected mobile terminal 2, and the processing goes to step 8 (S8).

If all the held applications of the connected mobile terminal 2 match the category to which the application already under control in the mobile terminal control apparatus 1 belongs, the processing ends, assuming that there is no held application to start controlling.

Step 7 is equivalent to a category determination step in which the categories of the controlled application and the held application match each other or not, and an app decision step in which an application to be controlled is decided on.

Meanwhile, if there are plural mobile terminals 2 that are already connected to the mobile terminal control apparatus 1, Step 7 is carried out with each mobile terminal 2. When it is determined that none of the categories of the controlled applications of the already connected mobile terminals 2 matches, the processing shifts to Step 9.

If the last app ID of the device ID=002 in the connection history 11 is A, as shown in FIG. 5, the application control unit 14 determines that the category to which B belongs, that is, the other held application than A, and the category to which A belongs, match each other or not. Since the category (MAP) of B is different from the category (AUDIO) of A, as shown in FIG. 4, the held application with the held app ID=B is decided as the application to be controlled at the mobile terminal 2.

If the last app ID of the device ID=002 in the connection history 11 is A and the other held applications than A are F and H, as shown in FIG. 6, the application control unit 14 determines whether the categories to which F and H belong, that is, the other held applications than A, and the category to which A belongs, match each other or not. The categories of F and H are the same as the category of A (AUDIO), as shown in FIG. 4. Therefore, all the held applications of the connected mobile terminal 2 match the category to which the application already under control in the mobile terminal control apparatus 1, and the processing ends, assuming that there is no held application to start controlling.

If the last app ID of the device ID=002 in the connection history 11 is A and the other held applications than A are F and I, as shown in FIG. 7, the application control unit 14 determines whether the categories to which F and I belong, that is, the other held applications than A, and the category to which A belongs, match each other or not. The category of F is the same as the category of A (AUDIO), as shown in FIG. 4. However, the category of I (SNS) is different from the category of A (AUDIO). Thus, the held application with the held app ID=I is decided as the application to be controlled at the mobile terminal 2.

Figures 8, 9:
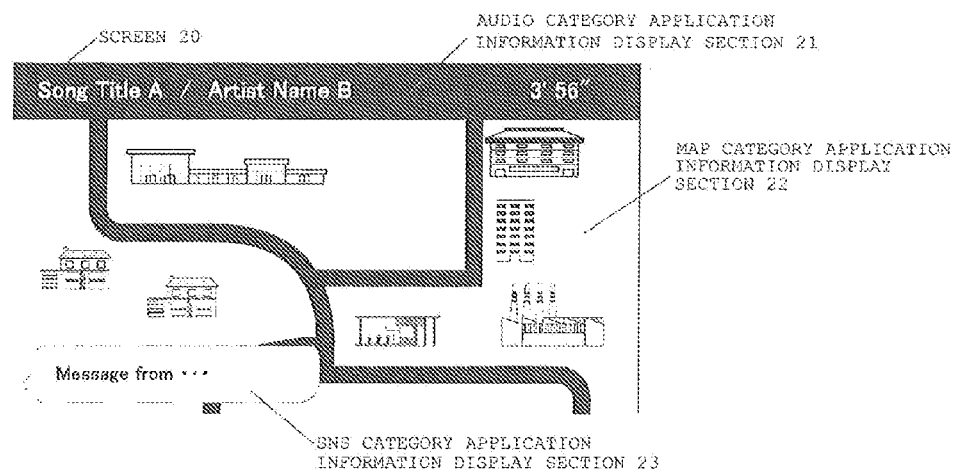
FIG. 8 is an explanatory view showing the connection history (specific example 5) of the mobile terminal control apparatus according to the embodiment of the invention.
FIG. 9 is an explanatory view showing a screen controlling plural applications of the mobile terminal control apparatus according to the embodiment of the invention.

If the last app ID of the device ID=002 in the connection history 11 is A and the other held applications than A are E and I, as shown in FIG. 8, the application control unit 14 determines whether the categories to which E and I belong, that is, the other held applications than A, and the category to which A belongs, match each other or not. In this embodiment, the application control unit 14 carries out this determination in order from the held application with the large number of times of control recorded in the connection history 11. In FIG. 8, the number of times of control of E is 10, and the number of times of control of I is 5. Therefore, the determination is carried out on the held application E before I. The category of E (MAP) is different from the category of A (AUDIO), as shown in FIG. 4. Therefore, the held application with the held app ID=E is decided as the application to be controlled at the mobile terminal 2.

By the above method, when plural held applications of different categories from the category of the controlled application exist among held applications, a held application having a large number of times of control in the past can be decided as the application to be controlled at the mobile terminal 2.

In Step 8 (S8), the held app ID determined in Step 7 (S7) is started up and control thereof is started.

The application control unit 14 in the mobile terminal control apparatus 1 sends a control start instruction for the target held app ID to the mobile terminal 2 via the driver unit 10. The application control unit 14 updates the last app ID of the connected mobile terminal 2, the under-control flag of the held app ID, and the number of times of control, in the connection history 11.

In Step 9 (S9), control of the application controlled in the previous connection in the connected mobile terminal 2 is started.

This Step 9 is equivalent to an application decision step in which a controlled application of the mobile terminal 2 detected in the terminal detection step S1 is decided on.

The application control unit 14 in the mobile terminal control apparatus 1 sends a control start instruction for the last app ID of the connected mobile terminal 2 and updates the under-control flag and the number of times of control of the held app ID on which control is started, in the connection history 11.

FIG. 9 is a screen 20 which is displayed on the display device 4 and in which plural mobile terminals 2 are connected and plural applications of different types are being controlled.

In FIG. 9, at least an AUDIO category application information display section 21, a MAP category application information display section 22, and an SNS category application display section 23 are displayed on the screen 20 of the display device 4. In the AUDIO category application information display section 21, title, artist name, reproduction time and the like are displayed, which are the information of a music being reproduced. In the MAP category application information display section 22, map data, navigation information and the like are displayed. In the SNS category application information display section 23, contents of messages received by and sent from the connected mobile terminal 2 are displayed.

As described above, according to this embodiment, by having the device control unit 12 which detects whether plural mobile terminals 2 are connected or not and which holds device information and application information in the connection history 11, and the application control unit 14 which determines an application to be controlled, of plural applications held on the connected mobile terminals 2, based on the connection history 11 and the application DB 13, the history of the connected mobile terminals and controlled applications, and the categories of controllable applications can be managed simultaneously. Therefore, when plural mobile terminals are connected to a vehicle-mounted device, an application to be controlled can be automatically determined in accordance with the connection history and the types of applications on the mobile terminals.

It should be noted that, while an example using only three types of categories held in the application DB 13 is described in this embodiment, types of controllable applications at the same time can be increased by acquiring types of categories from the mobile terminal 2 or forming types of categories in a hierarchical structure. Employing this configuration, the effect that plural applications can be controlled at the same mobile terminal is achieved.

INDUSTRIAL APPLICABILITY

The mobile terminal control apparatus and mobile terminal control method of the invention have the effect that, when plural mobile terminals are connected to a vehicle-mounted device, an application to be controlled can be automatically determined in accordance with the connection history and the types of applications on the mobile terminals. The apparatus and method are useful to a control apparatus that connects plural mobile terminals and controls applications.

REFERENCE SIGNS LIST

1 mobile terminal control apparatus
2 mobile terminal
3 input device
4 display device
5 audio output device
10 driver unit
11 connection history
12 device control unit (control unit)
13 application DB
14 application control unit (control unit)
15 system management unit
16 input control unit
17 display control unit
18 image data acquisition unit
19 audio data acquisition unit
20 screen of display device 4
21 AUDIO category application information display section
22 MAP category application information display section
23 SNS category application information display section

The invention claimed is:

1. A mobile terminal control apparatus comprising:
  a device controller that detects whether a plurality of mobile terminals with device IDs are connected and that holds device information and application information of each of the plurality of mobile terminals in a connection history; and
  an application controller, wherein if the device controller determines that a second mobile terminal is connected after connection of a first mobile terminal with a device ID different from that of the second mobile terminal, the application controller:
    acquires a controlled application ID of an application that is under control of the second mobile terminal and a held application ID of an application that is held on the first mobile terminal from the connection history,
    determines whether a category of the held application ID matches a category of the controlled application ID, and
    decides a held application ID whose category does not match the category of the controlled application ID as a control target.

2. The mobile terminal control apparatus according to claim 1, wherein the application controller determines whether the category of the held application matches the category of the controlled application in an application database where controllable applications are classified and recorded by category, and if the category of the held application ID and the category of the controlled application ID belong to the same category, it is determined that the category of the held application ID matches the category of the controlled application ID, and if the category of the held application ID and the category of the controlled application ID do not belong to the same category, it is determined that the category of the held application ID and the category of the controlled application ID do not match.

3. The mobile terminal control apparatus according to claim 2, wherein:
  the application controller acquiring the held application ID of the application that is held on the first mobile terminal from the connection history comprises the application controller acquiring a held application ID of a last application that is used in previous control of the first mobile terminal from the connection history; and
  the application controller determining whether the category of the held application ID matches the category of the controlled application ID comprises the application controller first determines whether a category of the held application of the last application matches the category of the controlled application ID.

4. The mobile terminal control apparatus according to claim 3, wherein the application controller further acquires a number of times of control in the past of the held application ID of the first mobile terminal from the connection history; and determines whether the category of the held application ID matches the category of the controlled application ID in order starting from an acquired held application ID with the largest number of times of control in the past.

5. A mobile terminal control method performed with a controller of a mobile terminal control apparatus, the control method comprising:
- determining if a second mobile terminal is connected after connection of a first mobile terminal with a device ID different from that of the second mobile terminal,
- acquiring a controlled application ID of an application that is under control of the second mobile terminal;
- acquiring a held application ID of an application that is held on the first mobile terminal from a connection history held in the mobile terminal control apparatus;
- determining whether a category of the held application ID matches a category of the controlled application ID; and
- deciding the held application ID whose category does not match the category of the controlled application ID as a control target.

6. The mobile terminal control method according to claim 5, wherein determining whether the category of the held application ID matches the category of the controlled application ID occurs in an application database where controllable applications are classified and recorded by category, and if the category of the held application ID and the category of the controlled application ID belong to the same category, it is determined that the category of the held application ID matches the category of the controlled application ID, and if the category of the held application ID and the category of the controlled application ID do not belong to the same category, it is determined that the category of the held application ID and the category of the controlled application ID do not match.

7. The mobile terminal control method according to claim 6, wherein acquiring the held application ID of the application that is held on the first mobile terminal from the connection history held in the mobile terminal control apparatus comprises acquiring a held application ID of a last application that is used in previous control of the first mobile terminal from the connection history; and
- determining whether the category of the held application ID matches the category of the controlled application ID comprises determining whether a category of the held application of the last application matches the category of the controlled application ID.

8. The mobile terminal control method according to claim 7, wherein acquiring the held application ID of the application that is held on the first mobile terminal from the connection history held in the mobile terminal control apparatus comprises acquiring a number of times of control in the past of held applications of the first mobile terminal from the connection history; and
- determining whether the category of the held application ID matches the category of the controlled application ID is conducted in order starting from an acquired held application ID with the largest number of times of control in the past.

* * * * *